(12) United States Patent
Chavez et al.

(10) Patent No.: US 8,849,637 B2
(45) Date of Patent: Sep. 30, 2014

(54) METHOD OF MODELING PRODUCTION FROM A SUBTERRANEAN REGION

(75) Inventors: Maria Alejandra Jimenez Chavez, Elrick-Westhill (GB); Michael Byrne, Fochabers (GB)

(73) Assignee: Senergy Holdings Limited, Aberdeen (GB)

( * ) Notice: Subject to any disclaimer, the term of this patent is extended or adjusted under 35 U.S.C. 154(b) by 567 days.

(21) Appl. No.: 12/788,166

(22) Filed: May 26, 2010

(65) Prior Publication Data

US 2011/0087473 A1    Apr. 14, 2011

(30) Foreign Application Priority Data

Oct. 9, 2009 (GB) .................................. 0917689.2

(51) Int. Cl.
 *G06G 7/48* (2006.01)
 *E21B 49/00* (2006.01)
 *G06F 17/50* (2006.01)

(52) U.S. Cl.
 CPC ............ *E21B 49/00* (2013.01); *G06F 17/5004* (2013.01); *G06F 2217/16* (2013.01); *G06F 17/5018* (2013.01)
 USPC ...................................... 703/10; 703/2; 703/9

(58) Field of Classification Search
 USPC .................................................. 703/2, 9, 10
 See application file for complete search history.

(56) References Cited

U.S. PATENT DOCUMENTS

| | | | | |
|---|---|---|---|---|
| 4,752,882 A | * | 6/1988 | Givens | 702/13 |
| 4,785,882 A | * | 11/1988 | Sprunt | 166/268 |
| 4,786,873 A | * | 11/1988 | Sherman | 324/323 |
| 5,027,379 A | * | 6/1991 | Hunt et al. | 378/4 |
| 5,331,155 A | * | 7/1994 | Blauch | 250/255 |
| 6,498,989 B1 | * | 12/2002 | Pisetski et al. | 702/14 |
| 7,025,138 B2 | * | 4/2006 | Kurkjian et al. | 166/250.05 |
| 7,031,841 B2 | * | 4/2006 | Zazovsky et al. | 702/12 |
| 7,356,413 B2 | * | 4/2008 | Georgi et al. | 702/11 |
| 8,234,073 B2 | * | 7/2012 | Pyrcz et al. | 702/11 |
| 2002/0013687 A1 | * | 1/2002 | Ortoleva | 703/10 |
| 2002/0121370 A1 | * | 9/2002 | Kurkjian et al. | 166/250.01 |
| 2004/0008580 A1 | * | 1/2004 | Fisher et al. | 367/56 |
| 2005/0136270 A1 | * | 6/2005 | Besnoin et al. | 428/469 |
| 2005/0171699 A1 | * | 8/2005 | Zazovsky et al. | 702/11 |
| 2005/0234690 A1 | * | 10/2005 | Mainguy et al. | 703/10 |
| 2007/0199721 A1 | * | 8/2007 | Givens et al. | 166/382 |
| 2007/0235189 A1 | * | 10/2007 | Milne et al. | 166/280.1 |
| 2008/0015832 A1 | * | 1/2008 | Tardy | 703/10 |
| 2008/0060811 A1 | * | 3/2008 | Bour et al. | 166/291 |
| 2008/0066536 A1 | * | 3/2008 | Goodwin et al. | 73/152.24 |
| 2008/0162100 A1 | * | 7/2008 | Landa | 703/10 |
| 2008/0272181 A1 | * | 11/2008 | Wang et al. | 228/234.3 |
| 2008/0319726 A1 | * | 12/2008 | Berge et al. | 703/10 |
| 2009/0043554 A1 | * | 2/2009 | Horne et al. | 703/10 |
| 2009/0043555 A1 | * | 2/2009 | Busby et al. | 703/10 |
| 2009/0071239 A1 | * | 3/2009 | Rojas et al. | 73/152.28 |

(Continued)

*Primary Examiner* — Omar Fernandez Rivas
*Assistant Examiner* — Kibrom Gebresilassie
(74) *Attorney, Agent, or Firm* — Meyertons, Hood, Kivlin, Kowert & Goetzel, P.C.; Eric B. Meyertons (57) ABSTRACT

A method of computational fluid dynamic modelling of a subterranean region comprises: defining a computational domain by generating a geometrical model of a subterranean region comprising a wellbore and a surrounding formation; associating knowledge of a physical property of the subterranean region with a computational parameter; and inputting the computational parameter into the computational domain. In one embodiment knowledge of permeability within the subterranean region is defined as a viscous resistance within the computational domain.

14 Claims, 8 Drawing Sheets

(56) References Cited

U.S. PATENT DOCUMENTS

| | | | |
|---|---|---|---|
| 2009/0211752 A1* | 8/2009 | Goodwin et al. | 166/250.02 |
| 2009/0299636 A1* | 12/2009 | Carnegie et al. | 702/6 |
| 2010/0198638 A1* | 8/2010 | Deffenbaugh et al. | 705/7 |
| 2010/0217574 A1* | 8/2010 | Usadi et al. | 703/10 |
| 2010/0274546 A1* | 10/2010 | Zafari et al. | 703/10 |
| 2012/0191433 A1* | 7/2012 | Heidari et al. | 703/10 |
| 2012/0221302 A1* | 8/2012 | Lewandowski et al. | 703/2 |

* cited by examiner

METHOD OF MODELING PRODUCTION FROM A SUBTERRANEAN REGION

BACKGROUND TO THE INVENTION

1. Field of the Invention

The present invention relates to modelling a subterranean region. More particularly to computational fluid dynamic modelling of a region including a wellbore and surrounding formation.

2. Description of the Relevant Art

In the oil and gas exploration and production industry various efforts are made to assess and predict the likely flow performance from a formation. The accurate prediction of performance, particularly well inflow from the formation, helps with appraisal of development prospects, well planning and reliable prediction of true well and field value. Also, the ability to evaluate and assess the likely outcome of any specific actions associated with the well and of particular well designs will permit sensible and informed choices to be made during the design phase to ensure maximum well output.

Conventional approaches to assessing potential well performance include performing detailed appraisal operations within an established wellbore. This, however, usually requires the use of temporary completions, major in-well operations and the like which requires significant fiscal and time expenditure. Also, such in-well appraisals are restricted in that the ability to experiment with potential designs is limited as a poor test design may generate irreversible formation damage, perhaps resulting in abandonment of the well.

It is also known in the art to perform simulations of the well, attempting to evaluate virtual flow conditions and the like to provide an estimate of well performance. However, existing techniques are restricted to analytical approaches which rely on solving analytical equations derived assuming simplifications, which make it possible to obtain simple and fast answers. The simplifications made during prediction analysis based on analytic approaches are often driven by a lack of understanding of the physical conditions within both the formation and the wellbore, and take no account of the effect the creation of the wellbore has on the formation. For example, some analytical approaches simply assume homogeneity within the formation, and often ignore features associated with the wellbore and its impact on formation conditions. These analytical approaches therefore usually produce poor predictions, and are often used to identify possible general trends associated with the wellbore, rather than virtual data which is considered to accurately reflect reality.

SUMMARY

In one embodiment, a method of modelling of a subterranean region includes defining a computational domain by generating a geometrical model of a subterranean region comprising a wellbore and a surrounding formation; associating knowledge of a physical property of the subterranean region with a computational parameter; and inputting the computational parameter into the computational domain.

The method may include computational fluid dynamic modelling of a subterranean region.

In an embodiment, a modelling system configured for computational fluid dynamic modelling of a subterranean region, includes: means for defining a computational domain by generating a geometrical model of a subterranean region comprising a wellbore and a surrounding formation; means for associating knowledge of a physical property of the subterranean region with a computational parameter; and means for inputting the computational parameter into the computational domain.

In one embodiment, a method of deriving a computational parameter for use in computational fluid dynamics modelling of a subterranean region, includes: obtaining a geological sample from a subterranean region; subjecting the sample to testing; identifying at least one physical property of the sample; and converting the at least one physical property into one or more computational parameters.

In an embodiment, a method of designing a well using computational fluid dynamics, includes: determining a proposed feature of a subterranean region comprising a wellbore and a surrounding formation; defining a computational domain comprising a geometrical model of the subterranean region including the wellbore and surrounding formation; associating knowledge of a physical property of the subterranean region with a computational parameter; and inputting the computational parameter into the computational domain.

In an embodiment, a method of computational fluid dynamic modelling of a subterranean region includes defining a computational domain comprising a formation region; and associating knowledge of damage within the formation with a viscous resistance within a computational domain.

BRIEF DESCRIPTION OF THE DRAWINGS

These and other aspects of the present invention will now be described, by way of example only, with reference to the accompanying drawings.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In one embodiment a method of modelling of a subterranean region, includes defining a computational domain by generating a geometrical model of a subterranean region comprising a wellbore and a surrounding formation; associating knowledge of a physical property of the subterranean region with a computational parameter; and inputting the computational parameter into the computational domain. The method may include computational fluid dynamic modelling of a subterranean region.

Computational fluid dynamics (CFD) is a branch of fluid mechanics that permits the prediction of fluid flow, heat and mass transfer and associated phenomena by numerically solving appropriate governing mathematical equations applied to a region of interest which is discretized into a finite number of discrete elements or cells. Through appropriate mathematical manipulation the governing equations are discretized into a set of algebraic equations which are numerically solved to provide the solution field.

In use, a subterranean region may be modelled numerically by use of CFD, while including both a wellbore and surrounding area and thus taking into account the combined effect of both. Furthermore, the present invention may account for physical properties associated with the subterranean region by using knowledge of these and associating this knowledge with one or more computational parameters which are capable of being represented within the computational domain, and thus accounted for in the solution. Accordingly, the present invention substantially improves on prior art techniques in which significant simplifications and omissions are made in order to permit use of analytical techniques, which can result in significantly skewed and inaccurate results. This may in turn result in the selection of a poor well design.

The computational domain may be defined to reflect a generally symmetrical model of at least a portion of the subterranean region. For example, a portion of the computational domain may be defined which includes a symmetrical representation of features, property distribution or the like of the subterranean region. In one arrangement the computational domain may be defined with symmetrisation about an axis of the wellbore.

The computational domain may be defined to reflect a generally asymmetrical model of at least a portion of the subterranean region. This arrangement may permit a more accurate model of a subterranean region to be defined. Asymmetry within a portion of the subterranean region may be used to reflect features affected by, for example, gravity and the like.

The method may include associating knowledge of one or more physical properties of the formation with a computational parameter. A physical property may include a geological property such as geological type, mechanical properties such as rock strength, thermodynamic properties and the like.

The method may include associating knowledge of a physical property including permeability with a computational parameter. Permeability of the formation and/or features of the wellbore may be associated with a computational parameter. The method may include defining a computational domain which includes a porous media. The method may include applying a general equation of fluid flow in a porous media within the computational domain. The method may include incorporating knowledge of permeability, such as formation permeability, within the general equation of fluid flow in a porous media. The method may include modelling the effects of a porous media in terms of viscous and inertial losses. The method may include defining knowledge of permeability within the subterranean region as a viscous resistance within the computational domain. The method may include defining permeability of the subterranean region in terms of flow resistance. Flow resistance may be indirectly proportional to permeability.

Alternatively, or additionally, a porous structure may be defined geometrically within the computational domain. For example, individual pores within a matrix may be defined geometrically within the computational domain.

The method may include associating knowledge of a physical property including formation damage with a computational parameter. Accounting for damage within the formation may permit modelling to be based on conditions which are closer to reality, providing increased modelling accuracy. Formation damage may include damage caused during creation of the wellbore, for example during drilling. Damage within the formation may be caused by exposure to a drilling fluid. Formation damage may include damage caused by wellbore architecture, installation and/or use of such architecture, for example during deployment of tubing, during a cementing operation, setting of packers or the like.

The method may include associating knowledge of formation damage with permeability. The method may include associating knowledge of damage within a formation with a reduction in permeability, increase in flow resistance, additional restriction or the like, relative to an undamaged region. The method may include defining knowledge of damage within a formation as a viscous resistance within the computational domain. Damage within the formation may be represented from micron scale to meters.

The method may include associating knowledge of a physical property, such as formation damage, in the region of an interface between the wellbore and surrounding formation. This may permit the effects of near wellbore conditions to be accounted for. The method may include associating knowledge of a physical property, such as formation damage, in the region of an interface between a void within the formation, such as a perforation tunnel, hydraulic fracture or the like, and the formation.

The method may include defining a computational domain which includes a single formation zone. The single formation zone may represent the entire formation being modelled. The method may include defining a computational domain which includes a single formation zone with at least one homogeneous physical property, for example, a homogeneous permeability property. In such an arrangement a physical property, such as permeability may be constant throughout the formation zone. The method may include defining a computational domain which includes a single formation zone with an inhomogeneous physical property. For example, the single formation zone may comprise a variable physical property, such as a variable permeability property, throughout the zone.

The method may include defining a computational domain which includes a plurality of formation zones. The plurality of formation zones may represent the entire formation being modelled. One or more of the plurality of formation zones may individually include at least one homogeneous physical property. Accordingly, one or more of the formation zones may individually include a physical property, such as permeability, which is constant throughout the individual zone. At least two formation zones may individually include a homogeneous physical property, wherein the physical property is inhomogeneous between the at least two formation zones. This arrangement may advantageously permit each individual zone to be independently modelled as being homogeneous, while still representing a global inhomogeneous or heterogeneous nature of the formation. This may advantageously reduce the complexity of the computational domain.

In other embodiments one or more of the plurality of formation zones may individually include at least one heterogeneous physical property.

The method may include defining a computational domain which includes geometrical features within the formation. The method may include defining a computational domain which includes geometrical features of at least one void region. The void region may include a perforation, a fracture, such as a natural fracture, generated fracture, or the like. Geometrical features of at least one void region may be determined separately and then inputted into the computational domain. For example, geometrical features of at least one void region may be determined from measurement of the formation, for example by logging techniques, seismic analysis or the like. Geometrical features of at least one void region may be estimated, calculated or the like. Geometrical features of at least one void region may be modelled using known techniques, such as using fracture propagation modelling, micro modelling of fractured zones or the like. Geometrical features of at least one void region may be estimated, calculated or modelled by, for example, structural analysis techniques, such as a finite element analysis (FEA) system.

Geometrical features of at least one void region may be determined by, for example, modelling, at least partially, within the computational domain. For example, the computational domain may be arranged to permit modelling of propagation of a void, such as a fracture, perforation. In an embodiment, the method may include or be used in combination with a finite element model or simulation of rock strength or the like to evaluate potential for rock failure, pore and fracture growth or collapse, sand transport and the like. This may advantageously be achieved within a single model.

In one embodiment the computational domain may be associated with, incorporate or the like mechanical rock strength modelling to simulate failure, crack initiation and propagation, movement of rock or the like. Such simulation may be achieved to determine, for example, different effects within the subterranean region upon exposure to different conditions, such as pressures, stresses and the like. For example, the method may include or be used in combination with rock strength analysis methods to determine the impact on the formation rock integrity of a fast pressure wave propagated in this media, for example, after a fast valve closure occurs in a wellhead or in the wellbore.

The method may include modelling a material located within at least one void. The material may include a granular material, such as a proppant, native material such as, for example, sand. A physical property of a material located within at least one void may be associated with a computational parameter and input into the computational domain. For example, a permeability property of a material located within at least one void may be associated with a computational parameter.

The method may include generating a computational domain which includes a collapsed formation region. The collapsed formation region may be computationally represented by defining a region with a complete or extremely large restriction to fluid flow.

The method may include defining a computational domain including features of multiple rock layers within a formation. The method may include defining a computational domain including geological features within the formation, such as faults, cross bedding and the like.

The method may include generating a computational domain which includes geometrical features of a wellbore. Such geometrical features may include dimensions, shape, contours or the like. Geometrical features may be defined to represent wellbore architecture, such as annulus regions, tubulars, valves, ports, channels, conduits or the like.

The method may include defining a computational domain which includes a single wellbore zone. The single wellbore zone may represent the entire wellbore being modelled. The method may include defining a computational domain which includes a single wellbore zone with at least one homogeneous physical property, such as permeability. The method may include defining a computational domain which includes a single wellbore zone with an inhomogeneous physical property.

The method may include defining a computational domain which includes a plurality of wellbore zones. The plurality of wellbore zones may represent the entire wellbore being modelled. One or more of the plurality of wellbore zones may individually include at least one homogeneous physical property. At least two formation zones may individually include a homogeneous physical property, wherein the physical property is inhomogeneous between the at least two formation zones.

At least one wellbore zone may represent a region of deposited material on a wall of the wellbore. The deposited material may include mud cake. A physical property of the mud cake may be associated with a computational parameter. A permeability property of the mud cake may be associated with a computational parameter.

At least one wellbore zone may represent an annulus region, such as an annulus region defined between a component located within the wellbore and wall of the wellbore, which wellbore may include mud cake or the like. The annulus region may be geometrically defined within the computational domain.

At least one wellbore zone may represent a wellbore component. The wellbore component may be defined geometrically within the computational domain. The wellbore component may include a tubular, such as a casing tubular, liner tubular, production tubular. The wellbore component may include a flow device or feature, such as fluid ports, perforations, a valve, an inflow control device or valve, a fracking valve, a recirculation valve or the like. The wellbore component may include a screen device, such as a sand screen device. The screen device may include a slotted or perforated sand screen, a gravel pack or the like. The screen device may be geometrically modelled within the computational domain. A physical property of the screen device, such as permeability, may be associated with a computational parameter and subsequently inputted into the computational domain.

The method may include defining a computational domain by generating a geometrical model of a subterranean region which extends from subterranean depth to surface level. The geometrical model may be defined to include substantially all elements including formation, reservoir region, near wellbore, completion, wellbore and associated tubing, chokes and all potential fluid restrictions. The model may be defined to include information of fluid flow parameters in elements of the wellbore, such as tubing. Fluid flow parameters may include, for example, fluid density, viscosity, turbulence, body forces. The method may include appropriately coupling flow in a porous media with flow in the wellbore, such as flow in an open channel, for example as defined by tubing. Accordingly, a complete or near complete model of a complete wellbore and formation may be captured in a single model.

The method may include obtaining knowledge of a physical property of the subterranean region. Knowledge of a physical property may be obtained from an external source. Knowledge of a physical property may be obtained by estimation, heuristic or experiential knowledge or the like.

The method may include obtaining knowledge of a physical property of the subterranean region by testing a sample material from a subterranean region. In this arrangement the method may include experimentally deriving knowledge of a physical property of a subterranean region. The method may include obtaining knowledge of a physical property of the subterranean region by testing a sample material from the formation. A sample material may be taken from the subterranean region being modelled. A sample material may be taken from a region which is adjacent to the subterranean region being modelled. A sample material may be selected which is known, estimated or the like to have similar or identical properties to that within the subterranean region being modelled. A sample material may include a core sample from the formation.

The method may include subjecting a sample material to one or more tests, such as a conductivity test, strength test or the like. The method may include subjecting a sample material to one or more flood tests. The method may include subjecting a sample material to one or more permeability tests. A permeability test may be configured to establish a permeability property of the sample material. A permeability test may be performed by application of Darcy's law, the diffusion equation or the like, to derive a permeability value associated with the sample material. A permeability test may be performed to determine a pressure drop across the sample and subsequently derive a permeability value based on the determined pressure drop.

A permeability test may be performed using a fluid selected from a subterranean region, such as the subterranean region being modelled. The fluid may include one or more hydrocarbons, water, gas, multiphase fluid or the like.

The method may include subjecting an unaltered sample material to one or more tests. This arrangement may permit a datum or base condition of the sample material to be derived. This datum condition may represent an undamaged region within the subterranean region. For example, the datum condition may represent a far field, i.e., located remotely from the wellbore, formation condition.

The method may include altering a sample material. The sample material may be altered by exposing said material to one or more expected conditions associated with the subterranean region. The expected conditions may include drilling conditions, such as drilling fluid or mud type, drilling fluid pressures, temperatures, production conditions, orientation and the like.

The method may include exposing a sample material to at least one drilling fluid condition, such as flow rate and/or pressure. Such exposure may permit damage to the formation caused by the drilling conditions to be replicated. For example, exposure of the formation sample to a drilling fluid may cause the drilling fluid, or a component thereof, to be absorbed by the sample material. This may result in a decrease in permeability. Exposure of a sample material to at least one drilling fluid condition may establish deposition of the drilling fluid, or a component thereof, on the surface of the sample material. This may replicate the creation of mud cake on a wall of a wellbore during drilling.

The method may include subjecting an altered sample material to one or more tests, such as flood tests. The one or more tests may include a permeability test. The permeability test may be configured to determine permeability of the altered sample, for example to determine any reduction in permeability caused by the process of altering the sample.

In one embodiment the method may include removing any deposited material from an altered sample material, and then subsequently performing one or more tests, such as a permeability test. This arrangement may permit the effect on one or more properties of the sample material attributable to the deposited material to be determined. This arrangement may permit a physical property of a deposited material, such as mud cake, to be associated with a computational parameter and inputted into the computational domain.

The method may include removing, for example by trimming, a portion of the altered sample material. The method may include subsequently subjecting the remaining sample material to one or more tests, such as a permeability test. This arrangement may permit the effect on one or more physical properties of the sample material attributable to the removed portion to be determined. Such a determined physical property may be associated with a computational parameter and inputted into the computational domain.

The removed portion of the sample material may be subject to one or more tests, such as a permeability test, to determine a physical property of said removed portion. Such a physical property may be associated with a computational parameter and inputted into the computational domain.

Removing a portion from the altered sample material and then subsequently subjecting one or both of the remaining sample material and removed portion to one or more tests may permit variations in one or more physical properties through a depth of the sample material to be determined, and then associated with a computational parameter. This may therefore permit accurate conditions, such as damage conditions, within the subterranean region to be modelled, and in particular conditions associated with and near to the wellbore.

The method may include sequentially removing portions from the altered sample material and then subjecting one or both of the remaining sample material and removed portions to one or more tests to permit a gradient or profile of one or more physical properties within the sample material to be determined. Such a gradient or profile may be represented within the computational domain, for example by defining different zones with different physical properties, and/or a single zone with varying properties.

The method may include orientating a sample material in a desired manner and then subjecting the sample material to one or more tests. The sample material may be orientated in a manner to reflect a subterranean location. This arrangement may permit a sample material to be tested in conditions similar to that in a subterranean location, and may permit similar effects, such as those of gravity and the like, to be taken into account. This may be advantageous in many applications of the present invention, such as in applications in which a deviated wellbore is being modelled. Such arrangement may permit an asymmetric representation of the subterranean region to be modelled.

In one embodiment a sample material may be orientated to reflect a subterranean location at an interface with the wellbore and formation. A sample material may be subjected to testing at numerous different orientations. Different sample materials may be subjected to testing at respective different orientations. For example, in one embodiment one or more sample materials may be subjected to testing while orientated generally horizontally. This may represent a lower and/or upper portion of a deviated wellbore. One or more sample materials may be subjected to testing while orientated generally vertically. This may represent side portions of a deviated wellbore. One or more samples may be subjected to testing while orientated obliquely.

Performing testing of sample materials oriented in various ways, such as vertically and horizontally, may represent variations due to gravity around the circumference of a horizontal or high angle well. This may permit inclusion of the impact of these variables on the CFD model parameters.

The method may include applying at least one boundary condition to the computational domain. At least one boundary condition may include a pressure, pressure differential, temperature, flow rate or the like. A pressure outlet associated with the wellbore may be defined as a boundary condition. A flow rate associated with the wellbore may be defined as a boundary condition. Such a flow rate may be determined in accordance with a productivity index, which index may be estimated, calculated or the like. A formation pressure may be defined as a boundary condition.

The method may include generating a mesh within the computational domain. The mesh may include finite cells, such as elements, areas, volumes or the like. The mesh may include equally sized cells. The mesh may include cells of different sizes. The method may include defining a finer mesh in regions requiring to be more accurately modelled, for example in the formation near the wellbore. The identification of different mesh areas may be established experimentally, for example by use of sample material testing to determine one or more physical properties, such as formation damage. In such an embodiment areas of increased damage may include a finer mesh than areas with less damage. The method may include generating a fixed mesh.

The method may include generating a variable mesh, such as an expandable mesh, collapsible mesh or the like. Such an arrangement may penult variations in the computational domain, such as geometrical variations, to be achieved. For example, hydraulic fractures, perforations or the like may subsequently be included or modelled within the computational domain.

The method may include defining a computational domain by generating a geometrical model of a subterranean region comprising multiple wellbores and a surrounding formation. This may permit simulation of a larger field, and optionally permit the interaction of different wells within a field to be modelled. One of the wellbores may define a production wellbore and one of the wellbores may define an injection wellbore.

The method may include modelling one or more properties of the subterranean region to assist in appraisal of development prospects, well planning, prediction of well and field value and the like. The method may include modelling a flow rate from wellbore. The method may include modelling inflow from the formation into the wellbore. The method may include modelling available pressure differentials between the formation and the wellbore.

The method may include performing sensitivity studies on a subterranean region. This may permit various conditions, operations, infrastructure to be modelled to assess any effects on the wellbore and/or formation, such as production rates and the like. For example, the method may include assessing sensitivities associated with different drilling conditions, such as different drilling fluids, pressures and the like. The method may permit the feasibility of advanced drilling and completion technologies, such as underbalanced drilling and managed pressure drilling to be evaluated by using knowledge of formation damage processes, converting to usable parameters in the computational domain, and evaluating the relative performance in terms of, for example, flow rate of wells, pressure profile and recoverable reserves per well.

The method may permit well tests to be simulated. For example, formation or reservoir parameters may be input into computational domain to create a model of fluid flow which can determine formation capacity, formation damage and the like for any combination of reservoir size, location, formation damage and skin. This is a significant advance on the use of conventional analytical models of transient flow during well testing.

The method may be used to permit fluid flow, temperature, pressure and fluid properties to be modelled to simulate, for example, the performance and efficiency of $CO_2$ injection for long term storage in subterranean layers.

The method may by used to permit fluid flow and heat transfer in thermal and hydrothermal wells to be simulated.

The method may be used to permit fluid flow, pressure and the impact of stress on fracture and cleat aperture and subsequently on fluid flow to be modelled for coal bed methane reservoir wells.

The method may permit the transport of solids, either introduced to the wellbore from the surface or produced from the formation may be modelled using knowledge of the type and rate of solids loading, fluid flow parameters and fluid entry to the wellbore.

The method may permit completion geometries specific to perforation technologies to be modelled and evaluated. For example, conventional perforations, deep perforations, sand jet perforations, jet propelled perforations, multiple bore perforations, perforation density and perforation orientation, near well drilling, acid drilling and other variations on the creation of a flow conduit from the wellbore to the reservoir may be modelled and evaluated for flow and pressure response and impact on well and reservoir performance.

The method may permit evaluation of optimum well length, orientation, size and geometry and the like.

The method may permit the bottom hole pressure to be determined for gas and oil wells through modelling the formation porous media and the wellbore in a single model. The method may permit the lifting capacity of a gas-condensate and other hydrocarbon system wells to be determined. The method may permit modelling of water and gas injection wells.

The method may include interfacing, either directly or indirectly, with input data from wireline and other well logs to generate suitable computational parameters to be inputted into the computational domain. Direct, or indirect, interface with IP (Interactive Petrophysics) may enable automatic import of log data in to the computational domain.

The method may be configured to permit modelling of a single or multiple phase fluid within the subterranean region. For example, the method may be configured to permit modelling or one or a combination of oil, water and gas.

The method may permit simulation of production logging tests to be performed. The method may include performing a pseudo or virtual production logging test or tests within the computational domain. A simulated production logging test may be created from log, core or production logging or a combination thereof which predicts or analyses fluid flow, volumes and distribution within the computational domain. The method may include simulating restricted well entry (e.g. selective perforation, oriented wells) while enabling full communication between simulated rock layers.

The method may include determining a virtual inertial resistance coefficient for oil and gas reservoirs and for other porous media used in oil and gas wells such as proppant packs.

The method may permit modelling asymmetric formation damage around wells to capture, for example, increased damage at the base of a horizontal well and increased drawdown and formation damage at the heel of a horizontal well section using computational fluid dynamics.

In an embodiment, a modelling system configured for computational fluid dynamic modelling of a subterranean region, includes: means for defining a computational domain by generating a geometrical model of a subterranean region comprising a wellbore and a surrounding formation; means for associating knowledge of a physical property of the subterranean region with a computational parameter; and means for inputting the computational parameter into the computational domain.

In one embodiment, a method of deriving a computational parameter for use in computational fluid dynamics modelling of a subterranean region includes: obtaining a geological sample from a subterranean region; subjecting the sample to testing; identifying at least one physical property of the sample; and converting the at least one physical property into one or more computational parameters.

The method may include identifying a permeability property of the sample. The method may include converting an identified permeability of the sample to a computational parameter comprising a viscous resistance. The method may include converting an identified permeability of the sample to a flow resistance computational parameter.

In an embodiment, a method of deriving a computational parameter for use in computational fluid dynamics modelling of a subterranean region may share features identified above in relation to the a method of modelling of a subterranean region.

In an embodiment, a method of designing a well using computational fluid dynamics, includes: determining a proposed feature of a subterranean region comprising a wellbore and a surrounding formation; defining a computational domain comprising a geometrical model of the subterranean region including the wellbore and surrounding formation; associating knowledge of a physical property of the subterranean region with a computational parameter; inputting the computational parameter into the computational domain. Accordingly, the method of designing a well may permit a proposed feature of a subterranean region to be simulated using CFD.

The method may include adding a feature to the computational domain. The method may comprise modifying, removing, replacing or the like a feature of a computational domain.

In an embodiment, a method of computational fluid dynamic modelling of a subterranean region includes defining a computational domain comprising a formation region; and associating knowledge of damage within the formation with a viscous resistance within a computational domain.

In an embodiment, computational fluid dynamics are used to model a subterranean region which includes both a wellbore and a surrounding formation. In one embodiment, suitable computational parameters are obtained and used within the CFD model to assist in producing accurate simulation results. These embodiments described may be provided independently or in combination. However, a description is provided below which demonstrates an exemplary embodiment of aspects of embodiments in combination.

Figure 1:
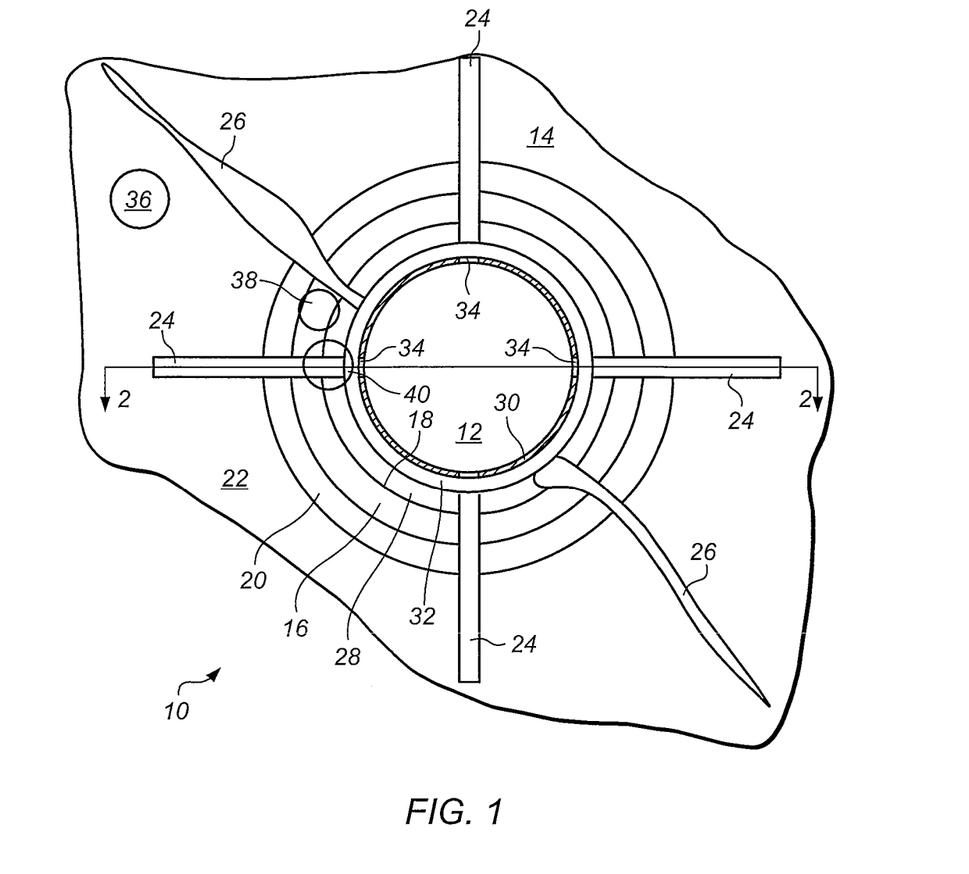
FIG. 1 represents a lateral cross-section of a portion of a computational domain which includes both a wellbore and surrounding formation.
Figure 2:
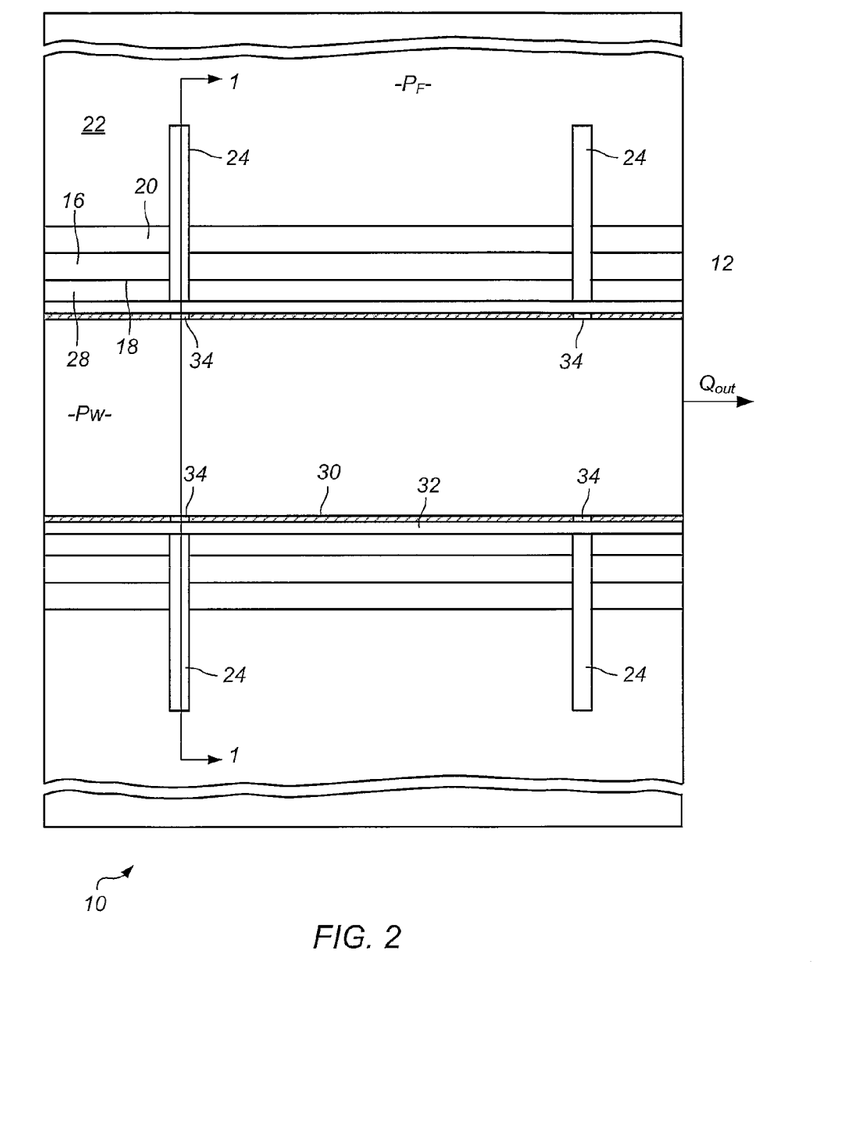
FIG. 2 represents a longitudinal cross-section of the computational domain of FIG. 1.

Referring initially to FIGS. 1 and 2, a portion of a computational domain, generally identified by reference numeral 10, is shown which includes a geometrical model of a wellbore 12 and surrounding formation 14. In the embodiment described a three dimensional domain 10 is defined, and the domain 10 is shown in FIG. 1 in lateral cross-section, taken through line 1-1 of FIG. 2, and is shown in FIG. 2 in longitudinal cross-section, taken through line 2-2 of FIG. 1. It should be understood that the dimensions and aspect ratios of the domain 10 have been selected for illustrative purposes, and these may vary considerably in reality. For example, the wellbore 12 and formation 14 may be modelled to extend for many thousands of meters. As will be discussed below, in the exemplary embodiment described the computational domain is for use in performing CFD modelling within the domain, and specifically for modelling inflow from the formation 14 into the wellbore 12.

One or more physical properties of the subterranean region are established and then associated with one or more computational parameters to be inputted into the computational domain 10. A physical property of the subterranean region may be established by performing tests of sample material taken from the formation being modelled, as will be discussed below.

The present invention may permit a number of physical properties within the subterranean region to be associated with a computational parameter to thus be modelled within the domain 10. In the present embodiment a physical property including permeability within the subterranean region is established and associated with a computational parameter. In this respect, the formation 14 is defined within the domain 10 as a porous media, and the CFD model is arranged to apply an equation of fluid flow which represents flow through a porous media by associating a resistance to flow within the media, specifically a viscous resistance and an inertial resistance. In the present embodiment, permeability data of the formation 14 is established and associated with a viscous resistance within the computational domain 10.

The present invention recognises that inaccurate modelling may occur if the formation 14 is considered to be entirely homogeneous. Accordingly, the computational domain 10 is defined to represent a heterogeneous model of the formation, and in the embodiment shown the formation 14 is modelled to have varying levels of damage in the region near the wellbore 12. This therefore permits a realistic model to be developed in which near wellbore damage is accounted for, which may include damage caused to the formation when the wellbore 12 is drilled. Such damage may be caused by absorption of the drilling fluid used during drilling of the wellbore 12. In the present embodiment damage is associated with a reduction in permeability, which as noted above is associated with a viscous resistance within the computational domain. Thus, an increase in permeability may be associated with a decrease in viscous resistance, and conversely a decrease in permeability may be associated with an increase in viscous resistance.

In the embodiment shown, the formation 14 includes three individual zones: a first zone 16 which defines an interface 18 with the wellbore 12 in the form of a bore wall; a second zone 20 which is positioned outwardly of the first zone 16; and a third zone 22 positioned outwardly of the second zone 20 and which extends to the depth of the formation 14 being modelled. The first zone 16 is modelled to include a homogeneous permeability property. Similarly, the second and third zones 20, 22 are modelled to each have a homogeneous permeability property. However, the permeability property differs between each zone 16, 18, 20, thus representing heterogeneity within the formation 14. In the computational domain 10 the first zone 16 is modelled to have the largest level of damage and thus the lowest permeability, the second zone 20 is modelled to have an intermediate level of damage and thus an intermediate permeability, and the third zone 22 is considered to have no damage and thus the highest permeability.

The computational domain 10 also geometrically defines a number of void features within the formation 14. Specifically, the computational domain 10 includes a number of perforation tunnels 24 and hydraulic fractures 26 (only shown in FIG. 1). In this respect perforation tunnels are used in the oil and gas industry to initiate production of subterranean fluids into the wellbore, and hydraulic fractures are used as a technique to increase or restore production rates from the formation. The geometry of the voids 24, 26 may be established by measurement from the formation being modelled. Such measurements may be achieved by logging techniques, seismic techniques or the like. Alternatively, the geometry of the voids may be estimated by a user, for example based on heuristic or experiential knowledge. The geometry of the voids 24, 26 may be determined by additional modelling techniques, such as by micro-modelling, structural modelling, for example using FEA modelling or the like. In other embodiments the geometry of the voids 24, 26 may be directly modelled within the computational domain 10, for example by combining with mechanical rock strength modelling to simulate fracture and movement of rock within the formation, for example under perforating and hydraulic fracturing conditions.

Although not shown, the computational domain 10 may be modified to include granular material in the perforation tunnels 24 or fractures 26, such as a proppant material. In such cases the associated void region may be associated with a permeability and viscous resistance parameter.

The wellbore 12 is modelled to include a region of mud cake 28 deposited on the wall 18 of the wellbore 12. Mud cake, or filter cake, is a phenomenon known in the art, and is caused when the drilling fluid or mud loses filtrate into the permeable formation, leaving behind residue carried by the mud. Mud cake can represent a significant restriction to flow and as such is accounted for in the present embodiment. In this respect a permeability property of the mud cake region 28 is obtained, by sample testing as discussed below, and a viscous resistance factor is inputted into the computational domain.

The wellbore 12 is also modelled to include a tubing string, specifically a production liner 30 which defines an annular region 32 with the mud cake region 28. The production liner 30 includes a plurality of inflow ports 34 which permit fluid communication from the annular region 32 into the production liner 30. The various features within the wellbore 12, such as the liner 30, annular region 32 and ports 34 are geometrically defined within the computational domain 10.

Figure 3A:
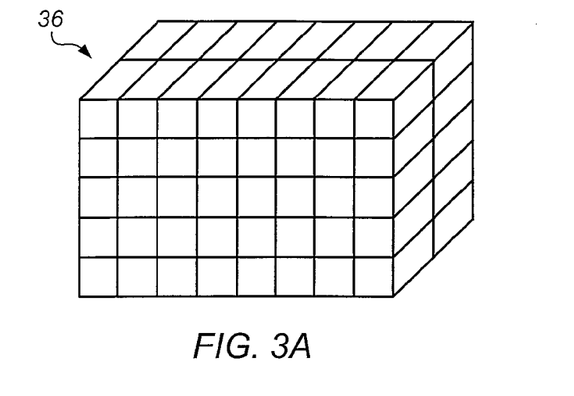
FIGS. 3(a) to (c) are diagrammatic representations of mesh densities used within the computational domain.
Figure 3B:
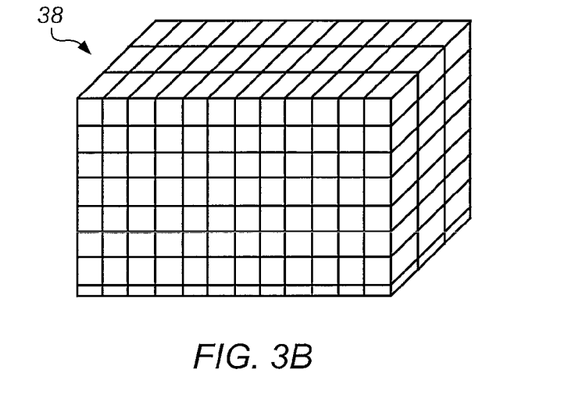
Figure 3C:
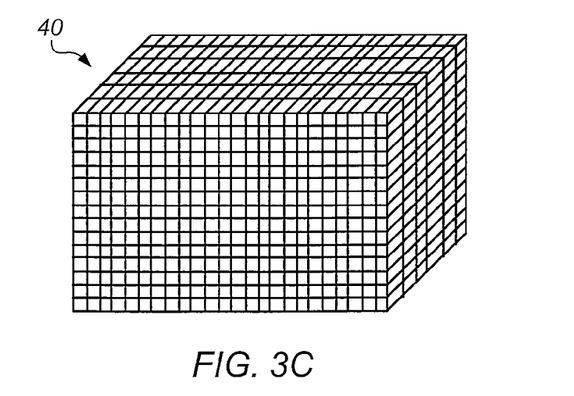

Once the computational domain 10 has been defined, the domain 10 is discretized into a mesh which includes a plurality of finite volumes. For clarity the mesh is not shown in FIGS. 1 and 2. In the present embodiment a mesh with a variable density is created, wherein a more dense or finer mesh is applied to areas requiring more accurate modelling. For example, a deeper region of the formation 14, such as in area 36 may include a low density mesh, such as is represented by FIG. 3($a$). A formation region which includes formation damage, such as area 38 in which more accurate modelling is required may include a finer mesh, as represented in FIG. 3($b$). Similarly, a region adjacent to the wellbore 12 and perforations, such as region 40 may include an even finer mesh, as demonstrated in FIG. 3($c$).

Figure 4:
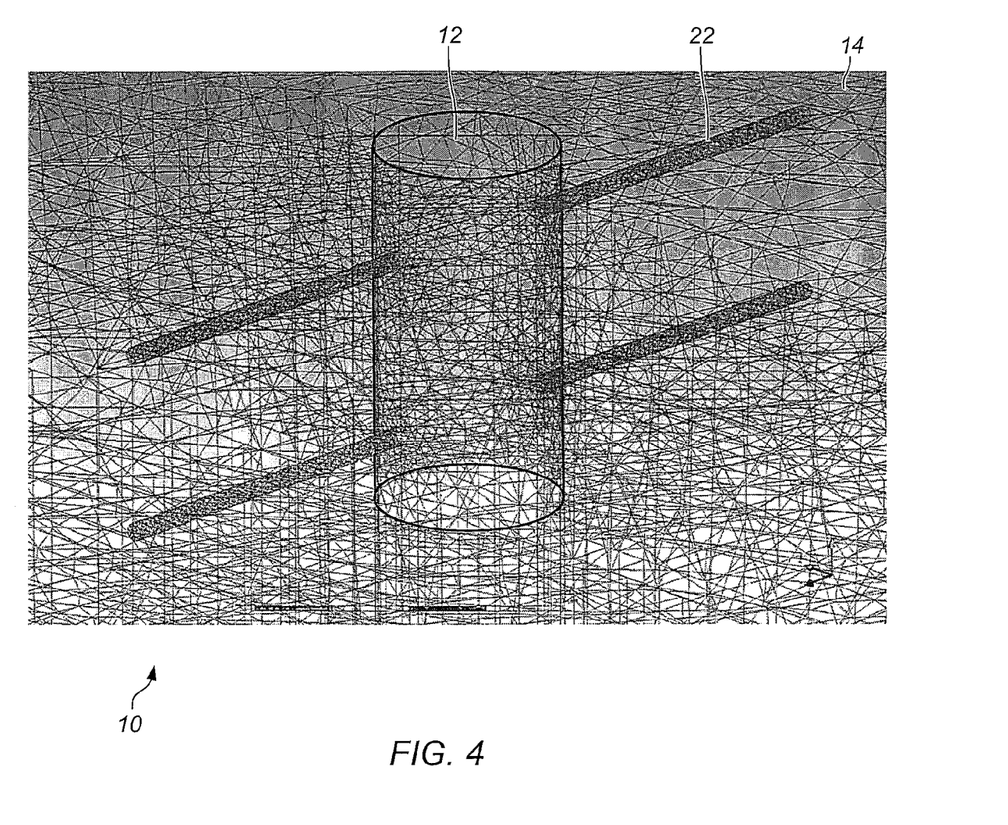
FIG. 4 shows a computational domain which includes a wellbore and surrounding formation, with a finite volume mesh applied.

It should be noted that the finite volumes shown in the mesh examples of FIGS. 3($a$) to ($c$) are generally cuboid. However, in some embodiments a mesh may be applied which includes generally polyhedra finite volumes. Such a mesh is shown in FIG. 4 in which features within the domain 10, such as the wellbore 12, formation 14 and perforations 24 can be recognized. It will be noted that the perforations 24 in FIG. 4 include a finer mesh than that in, for example, the wellbore 12.

Prior to execution of the CFD model various material properties are defined, such as oil density, viscosity, formation temperature and the like. Additionally, boundary conditions are prescribed to the domain 10 in order to permit initiation of the numerical modelling. The boundary conditions may include a pressure PF within the formation 14, a pressure PW within the wellbore 12, an estimated flow rate QOUT from the wellbore 12. It should be noted that an advantage of a numerical modelling system is the ability to prescribe different boundary conditions and to vary these to assist convergence of the simulation. As such, a user may vary the boundary conditions prescribed to the domain 10, or one or more boundary conditions may be automatically varied.

Figure 5:
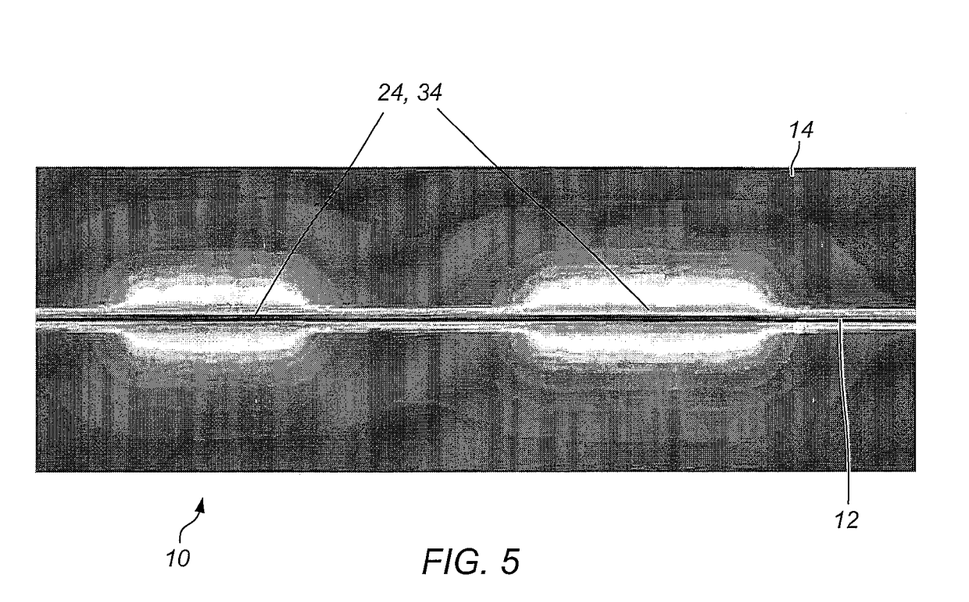
FIG. 5 is a pressure field diagram representing the pressure distribution within the computational domain of FIG. 1.

Once the domain 10 has been appropriately defined and suitable boundary conditions have been prescribed, a numerical analysis is performed within the domain using appropriate discretized governing equations to model fluid flow, such as an equation for fluid flow through a porous media. Such a numerical analysis will provide a solution in which various simulated parameters, such as pressures, fluid velocities and the like are determined within each finite volume. The results of the simulation may be visually presented, for example as shown in FIG. 5 which shows a pressure distribution throughout the domain 10 to reflect the drainage profile from the formation 14 into the wellbore 12. The profile shown in FIG. 5 accurately predicts drainage in the region of the perforations 24 and fluid inlet ports 34.

The present invention may extend to permit variations within the computational domain 10 to be made, such as changes in formation geometry, wellbore architecture and the like. This may permit virtual analysis of different well designs and their effect on, for example, inflow from the formation.

As noted above, various physical properties are determined, such as permeability, to be associated with a computational parameter for inputting into the computational domain 10. In the embodiment presented these physical properties are determined through testing of physical samples taken from the formation being simulated. An exemplary testing sequence of a sample will now be described with reference to FIGS. 6($a$) to ($f$).

Figure 6A:
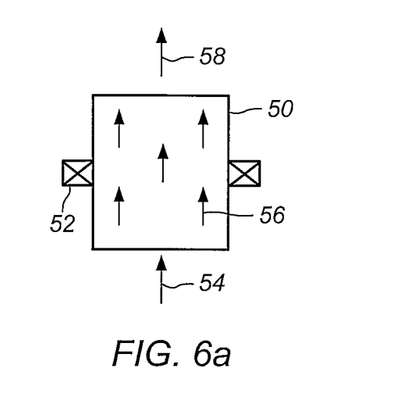
FIGS. 6(a) to (f) are diagrammatic representations of sequential steps in a process of deriving computational parameters for use in the computational domain of FIG. 1.

A formation sample 50, such as a formation core sample, is arranged to be subject to a permeability test by application of Darcy's lay. Specifically, the sample 50 is arranged in an appropriate apparatus 52 to prevent flow bypass, and a formation or reservoir fluid such as oil is driven through the sample 50, via its porous structure, as demonstrated by arrows 54, 56, 58. A measure of permeability, in units $m^2$, is derived from a measured pressure drop in the formation fluid across the sample 50. The test performed in FIG. 6($a$) may be used to provide permeability data associated with formation zone 22, which is assumed to be undamaged. This permeability data is associated with a viscous resistance within zone 22.

Figure 6B:
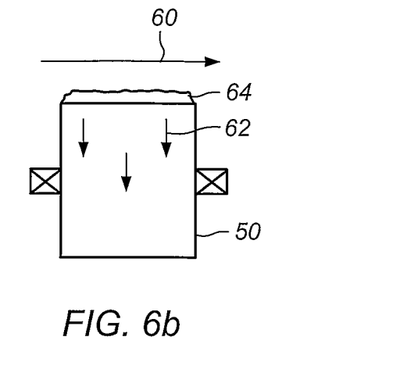
Figure 6C:
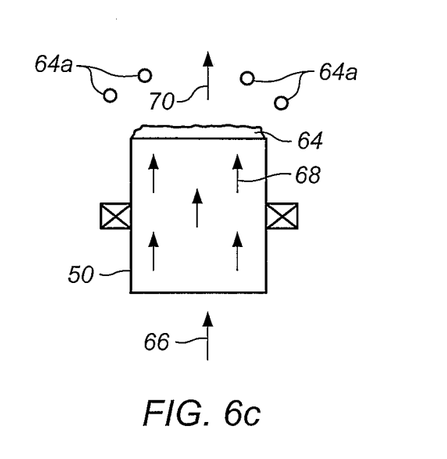
Figure 6D:
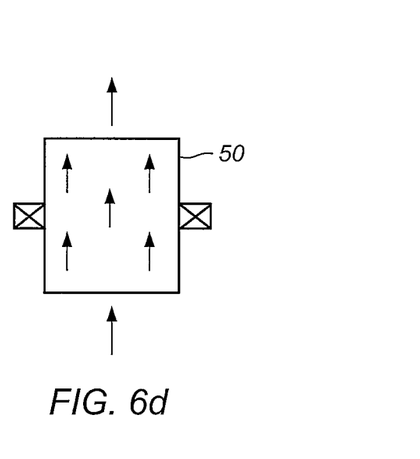

The sample material 50 may then be altered to reflect a known or expected formation condition. In the embodiment shown the sample 50 is subject to conditions normally associated with a drilling operation, as demonstrated in FIG. 6($b$). In this case one side of the sample 50 is exposed to a flow of drilling fluid, represented by arrow 60, at a drilling pressure, and an opposite side of the sample 50 is exposed to a formation pressure. This arrangement results in a portion of the drilling fluid permeating into the sample, as represented by arrows 62, and a residue being deposited on the surface of the sample to create a layer of mud cake 64. In this condition the permeated drilling fluid will manifest itself as formation damage, and the mud cake will create a restriction to flow.

A subsequent step, shown in FIG. 6($c$), involves subjecting the sample 50 which has been altered in FIG. 6($b$) to a flow condition associated with production from the formation by flowing a reservoir fluid through the sample 50, represented by arrows 66, 68, 70. This flow will displace some portions of mad cake 64$a$, and when a stable condition has been reached a permeability value is determined. This permeability value will reflect the additional flow restrictions generated by the damage within the formation and the remaining mud cake layer 64.

Following this the mud cake layer 64 is removed, as shown in FIG. 6($d$), and a permeability test is again performed to obtain a permeability value. The difference between the permeability value derived in FIG. 6($c$) and that derived in FIG. 6($d$) may represent the reduction in permeability associated with the mud cake layer 64. This reduction in permeability may be associated with a viscous resistance and inputted into the computational domain within region 28 of the wellbore 12.

Figure 6E:
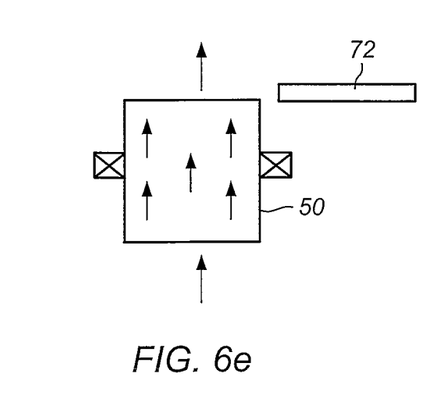

A portion 72 may then be removed or trimmed from the sample 50, as shown in FIG. 6(e), and the remaining sample again subjected to a permeability test. The difference between the permeability value derived in FIG. 6(d) and that derived in FIG. 6(e) may represent the reduction in permeability associated with a zone which is adjacent to the wellbore 12, specifically formation zone 16 (see FIGS. 1 and 2). This reduction in permeability may be associated with a viscous resistance and inputted into the computational domain within zone 16. The trimmed portion 72 may optionally or alternatively be subject to a permeability test to derive a permeability value for zone 16.

Figure 6F:
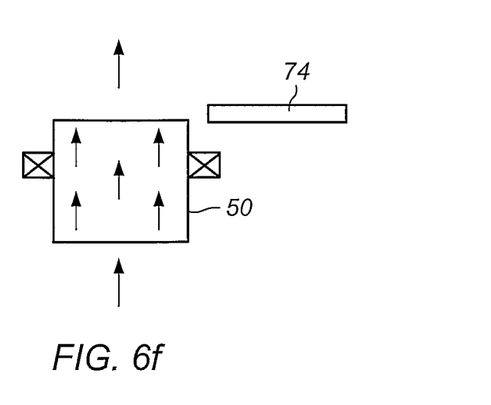

A further portion 74 may be removed from the sample 50, as shown in FIG. 6(f), and the processes of FIG. 6(e) repeated to derive a permeability value, and thus viscous resistance, for formation zone 20.

In the computational domain 10 represented in FIGS. 1 and 2, features of the subterranean region are represented symmetrically and as concentric zones. Specifically, the mud cake layer 28 and formation zones 16, 20 are symmetrically and concentrically represented. However, such symmetry may not accurately reflect actual conditions within a wellbore and formation, particularly in a deviated wellbore in which the effects of gravity and the like may produce a degree of asymmetry. Embodiments of the present invention, however, permit such asymmetry to be modelled. Such an embodiment is shown in FIGS. 7 and 8, reference to which is now made.

Figure 7:
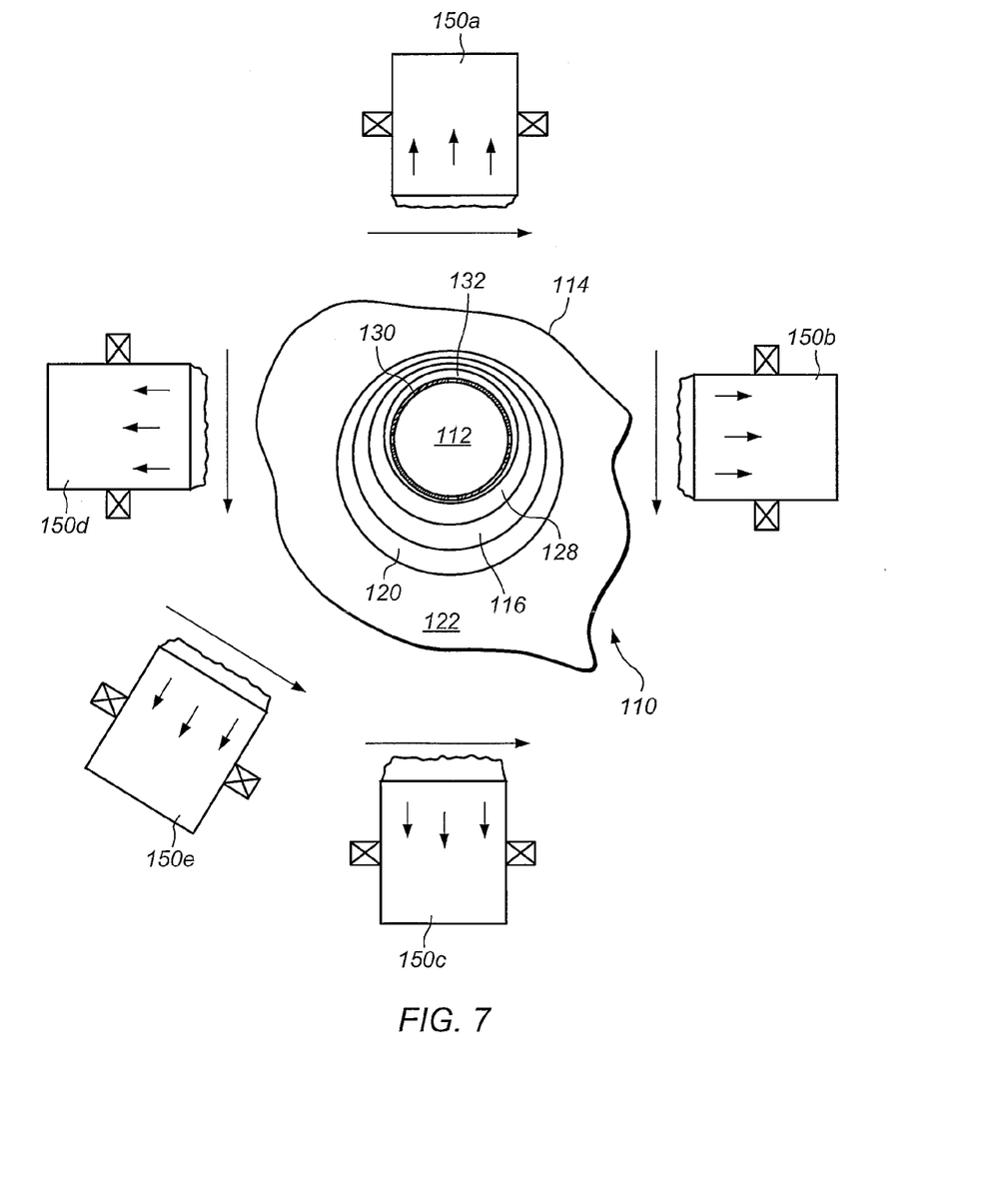
FIG. 7 represents a lateral cross-section of a portion of an alternative computational domain which includes both a wellbore and surrounding formation.
Figure 8:
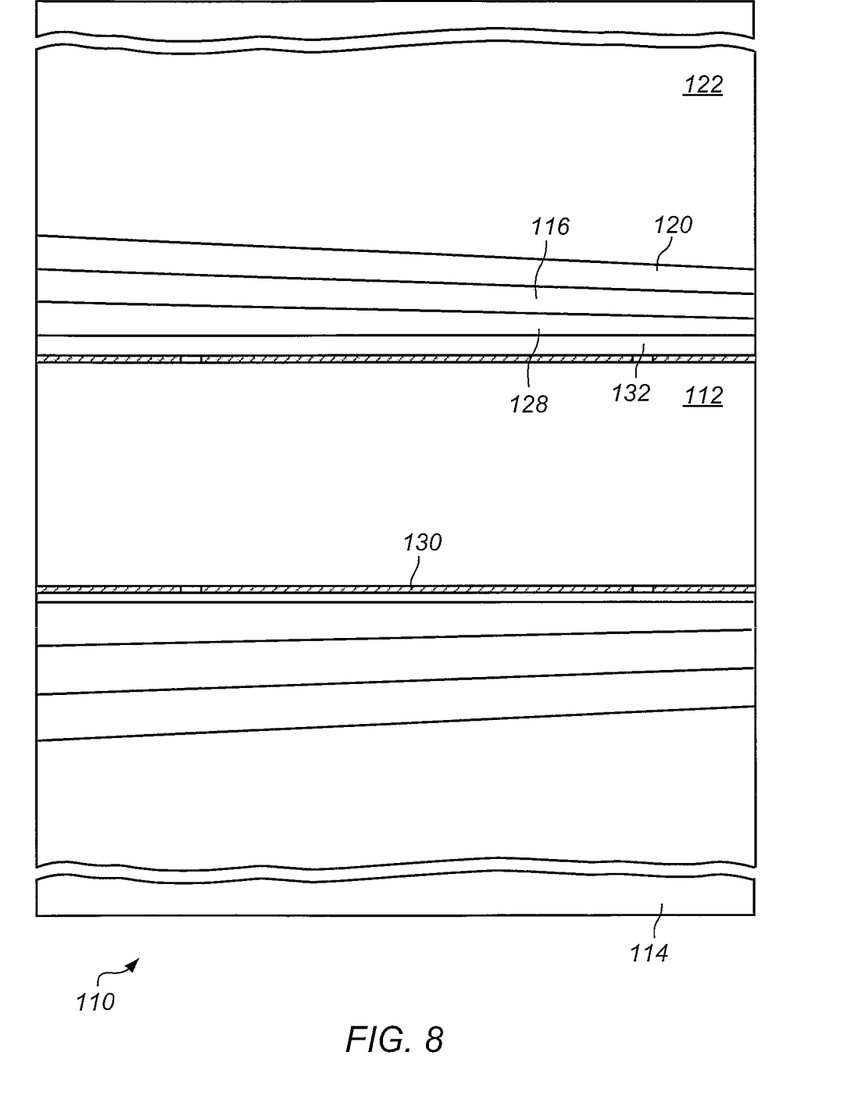
FIG. 8 represents a longitudinal cross-section of the computational domain of FIG. 7.

Referring initially to FIG. 7 there is shown a portion of a computational domain, which is generally identified by reference numeral 110. It should be noted that domain 110 is similar to that shown in FIG. 1, and as such like features share like reference numerals. Accordingly, domain 110 includes a geometrical model of a formation 114 which surrounds a wellbore 112, specifically a horizontal wellbore 112. The wellbore 112 includes a production liner 130, annular region 132 and a layer of mud cake 128 which has been deposited on a wall 118 of the wellbore 112. The formation 114 includes three individual zones: a first zone 116 which is adjacent the wellbore 112; a second zone 120 which is positioned outwardly of the first zone 116; and a third zone 122 positioned outwardly of the second zone 120 and which extends to the depth of the formation 114 being modelled. Each zone 116, 120, 122 represents different degrees of formation damage, in a similar manner to that described above. The computational domain 110 is populated with appropriate boundary conditions, parameters and the like and may be used to simulate flow conditions, such as inflow of a fluid from the formation 114 into the wellbore 112.

In the present embodiment the mud cake layer 128 and three formation zones 116, 120, 122 are non-concentric and thus represent an asymmetrical arrangement within the computation domain 110. In this case the asymmetric nature is considered to accurately reflect the affect of gravity on a horizontal wellbore.

In a similar manner to that described above, various physical properties are determined, such as permeability, to be associated with a computational parameter for inputting into the computational domain 110. In the present embodiment these physical properties are determined through testing of physical samples taken from the formation being simulated. Such testing may be performed in accordance with the exemplary testing sequence described above and shown in FIGS. 6(a) to (f). However, in the present embodiment different samples 150a-e are subjected to testing while being orientated in a desired manner to reflect a particular location within the domain 110. For example, sample 150a is subjected to testing while inverted to reflect the condition in an upper portion of the wellbore. Similarly, sample 150c is subjected to testing while being upright to reflect a lower portion of the wellbore, and samples 150b, 150d are tested in a side-on orientation to reflect side portions of the wellbore. Various other samples, such as sample 150e may be tested while being orientated in a desired manner. This arrangement may therefore permit the effect of gravity and the like to be taken into account, which may in turn permit the degree of asymmetry, for example of formation damage, to be established and modelled within the domain 110.

Furthermore, in the domain 10 first shown in FIG. 1 the symmetric distribution of features, such as zones 16, 20, 22 and mud cake layer 28 are considered to be uniform along the length of the wellbore 12, as reflected in FIG. 2. However, in the present embodiment, the asymmetric nature of the features within the subterranean region, such as zones 116, 120, 122 and mud cake layer 128, are considered to vary along the length of the wellbore, as shown in FIG. 8. This arrangement may more accurately reflect actual conditions within the formation region, for example where formation damage differs between the toe and heel of the wellbore 112.

The present invention permits a virtual simulation to be performed of a subterranean region which may allow potential well designs to be examined. For example, various drilling fluids may be used to determine the variation in formation damage and the like.

It should be understood that the embodiment described herein is merely exemplary and that various modifications may be made thereto without departing from the scope of the invention. For example, any number of zones may be modelled within the computational domain. Also, any wellbore infrastructure may be modelled, including sand screens, valves, chokes, and the like. Additionally, the wellbore may be modelled which extends from a subterranean region towards and even above surface level, and may be modelled to include surface equipment, such as BOPs, X-mas trees, manifolds, pumps and the like. Furthermore, the formation may be modelled to include different rock types and layers. Additionally, in the embodiments described a permeability property is derived to be input into a computational domain. However, other physical properties may be derives, such as conductivity, saturation data, ionic concentration or the like. Additionally, any feature of the formation may be modelled, and may include collapsed zones or the like. Additionally, formation damage in the region of a void, such as a perforation or fracture may be represented within the computational domain, for example as a permeability factor.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of computational fluid dynamic modeling of production from a subterranean region comprising a wellbore and surrounding formation, the method comprising:
   providing a computational geometric model of the subterranean region, the computational geometric model comprising the wellbore and surrounding formation;
   determining one or more zones in the surrounding formation of the computational geometric model, wherein the one or more determined zones surround the wellbore;
   associating a viscous resistance with at least one or more of the determined zones as a computational parameter, wherein the viscous resistance associated with one or more of the determined zones is a viscous resistance calculated from a sample material obtained from the surrounding formation, wherein the calculated viscous resistance is determined by altering the sample material obtained from the surrounding formation and exposing the sample material to one or more expected conditions associated with the subterranean region in order to provide formation damage; and
   computationally modeling, using a computer, the production through the one or more determined zones into the wellbore using the associated viscous resistance of each of the one or more determined zones.

2. The method according to claim 1, wherein the viscous resistance is derived from a permeability of a sample material obtained from the surrounding formation that has been subjected to the formation damage.

3. The method according to claim 1, wherein the method comprises determining two or more zones, each zone associated with a different viscous resistance; the viscous resistances being derived from a sample material obtained from the surrounding formation having been subjected to different amounts of formation damage.

4. The method according to claim 2, wherein the viscous resistance is derived from a sample material obtained from the surrounding formation oriented in a manner to reflect an orientation of a formation in the subterranean region.

5. The method according to claim 2, wherein the viscous resistance is derived from a sample material obtained from the surrounding formation that has been subjected to drilling fluid or mud flow.

6. The method according to claim 1 wherein at least one zone is representative of a layer of mud cake.

7. The method according to claim 1 wherein each further zone represents a different degree of formation damage.

8. The method according to claim 1 wherein the method further comprises:
   determining one or more voids in the formation, the voids being representative of perforation tunnels or fractures in the formation, and
   computationally modeling the production through the one or more zones and the one or more voids into the wellbore.

9. The method according to claim 1 further comprising:
   wherein determining the viscous resistance comprises subjecting the altered sample material to one or more permeability tests.

10. The method according to claim 1 wherein the one or more zones are asymmetric.

11. The method according to claim 1, wherein one or more of the expected conditions comprise at least one drilling fluid condition.

12. The method according to claim 9, further comprising removing any deposited material from the altered sample material before performing one or more permeability tests to determine one or more viscous resistances.

13. The method according to claim 9, further comprising removing a portion of the altered sample material and subsequently subjecting at least one of the remaining sample material and the removed portion to one or more permeability tests to determine one or more viscous resistances.

14. The method according to claim 1, further comprising orientating the sample material in a manner to reflect an orientation of the formation in the subterranean region when exposing sample material to one or more expected conditions.

* * * * *